United States Patent
Kim et al.

(10) Patent No.: US 9,685,809 B2
(45) Date of Patent: Jun. 20, 2017

(54) METHOD FOR CONTROLLING BATTERY CHARGING OPERATION AND ELECTRONIC DEVICE THEREOF

(71) Applicant: Samsung Electronics Co., Ltd., Gyeonggi-do (KR)

(72) Inventors: Beom-Ju Kim, Gyeonggi-do (KR); Seung-Beom Kang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 152 days.

(21) Appl. No.: 14/604,992

(22) Filed: Jan. 26, 2015

(65) Prior Publication Data

US 2015/0214763 A1 Jul. 30, 2015

(30) Foreign Application Priority Data

Jan. 27, 2014 (KR) .................. 10-2014-0009942

(51) Int. Cl.
*H02J 7/00* (2006.01)
(52) U.S. Cl.
CPC .................. *H02J 7/0073* (2013.01)
(58) Field of Classification Search
CPC ..................................... Y02E 60/12

USPC ........................................... 320/107
See application file for complete search history.

(56) References Cited

U.S. PATENT DOCUMENTS

| 5,889,382 A * | 3/1999 | Jung ............... H02J 7/0006 320/106 |
| 6,803,746 B2 | 10/2004 | Aker et al. |
| 2012/0217152 A1 | 8/2012 | Miller |
| 2015/0035477 A1* | 2/2015 | Wong ............... H02J 7/0068 320/107 |

FOREIGN PATENT DOCUMENTS

KR 10-2005-0043732 A 5/2005

* cited by examiner

*Primary Examiner* — Suresh Memula
(74) *Attorney, Agent, or Firm* — Cha & Reiter, LLC.

(57) ABSTRACT

A method and apparatus for controlling battery charging in an electronic device are provided. The electronic device may include a charging module, a connector, and one or more processors. Upon detecting charging by a power source, the one or more processors control the charging module to perform the charging of a battery cell by a first charging current through a first port of the connector. The one or more processors detect whether a voltage is applied through a second port of the connector, and if so, the one or more processors control the charging module to perform the charging of the battery cell using a second charging current through the first port and the second port of the connector.

17 Claims, 7 Drawing Sheets

METHOD FOR CONTROLLING BATTERY CHARGING OPERATION AND ELECTRONIC DEVICE THEREOF

CLAIM OF PRIORITY

The present application is related to and claims the benefit under 35 U.S.C. §119(a) from a Korean patent application No. 10-2014-0009942 filed in the Korean Intellectual Property Office on Jan. 27, 2014, the entire disclosure of which is hereby incorporated by reference.

BACKGROUND

1. Field of the Disclosure

The present disclosure relate to an apparatus and method for controlling battery charging process in an electronic device.

2. Description of Related Art

Electronic devices such as portable terminals, tablet computers, and smart phones provide easy portability and may store and execute a variety of programs. Also, these electronic devices are equipped with additional functions such as Internet search, camera, video recording, MPEG Audio Layer-3 (MP3), Digital Multimedia Broadcasting (DMB), and Global Positioning System (GPS) functions. Owing to these various functions, a frequency of operating the electronic devices is increasing which in turn increases the battery power consumption.

SUMMARY

In accordance with this, battery capacity increase is essential for using electronic devices for a long time with carrying the electronic devices. Also, it is necessary to increase the battery capacity without increasing a battery charging time.

Various embodiments may provide a method and apparatus for controlling battery charging operation in an electronic device.

Various embodiments may provide a method and apparatus for shortening a charging time of a battery in an electronic device.

According to various embodiments, an electronic device for charging a battery cell may include a charging module, a connector, and one or more processors. Upon detecting a power source applying, the one or more processors control the charging module to perform the charging of a battery cell by a first charging current value through a first port of the connector. The one or more processors detect whether a voltage is applied through a second port of the connector. When the voltage is applied through the second port of the connector, the one or more processors control the charging module to perform the charging of the battery cell through the $1^{st}$ port and the $2^{nd}$ port of the connector using a second charging current.

According to various embodiments, the first port and the second port may include some of a plurality of Vbus ports comprised in the connector.

According to various embodiments, the electronic device may further include a comparator for checking if a voltage is applied through the second port of the connector.

According to various embodiments, if the voltage is applied through the second port, the processor may control the charging module to perform the quick charging of the battery cell by the second charging current greater than the first charging current.

According to various embodiments, a method for controlling battery charging in an electronic device may include the processes of, upon charging power source applying, performing a charging of a battery cell through a first port of a connector, checking if a voltage is applied through a second port of the connector, and if the voltage is applied through the second port of the connector, performing the charging of the battery cell through the first port and the second port of the connector.

According to various embodiments, the process of performing the charging of the battery cell through the first port and the second port of the connector comprises the process of performing the quick charging of the battery cell by a second charging current greater than a first charging current for performing the charging of the battery cell through the first port.

According to various embodiments, an electronic device for charging a battery cell comprises a charging module; a connector including a first port and the second port; and one or more processors configured to control the charging module to check whether a first voltage is applied through the first port of the connector and a second voltage is applied through the second port of the connector, and if the first voltage is applied through the first port of the connector and second voltage is applied through the second port of the connector, control the charging module to perform the charging of the battery cell through the first port and the second port of the connector using a second charging current which is greater than a first charging current used only when the first voltage is applied through the first port of the connector.

According to various embodiments, the method of performing charging of a battery cell which is detachable from an electronic device or disposed in the electronic device comprises checking whether a first voltage is applied through a first port of a connector and a second voltage is applied through a second port of the connector, and if the first voltage is applied through the first port of the connector and second voltage is applied through the second port of the connector, performing charging of the battery cell through the first port and the second port of a connector using a second charging current which is greater than a first charging current used only when the first voltage is applied through the first port of the connector.

BRIEF DESCRIPTION OF THE DRAWINGS

The above and other aspects, features and advantages of various aspects of the present disclosure will become more apparent from the following detailed description when taken in conjunction with the accompanying drawings in which.

DETAILED DESCRIPTION

Figure 1:
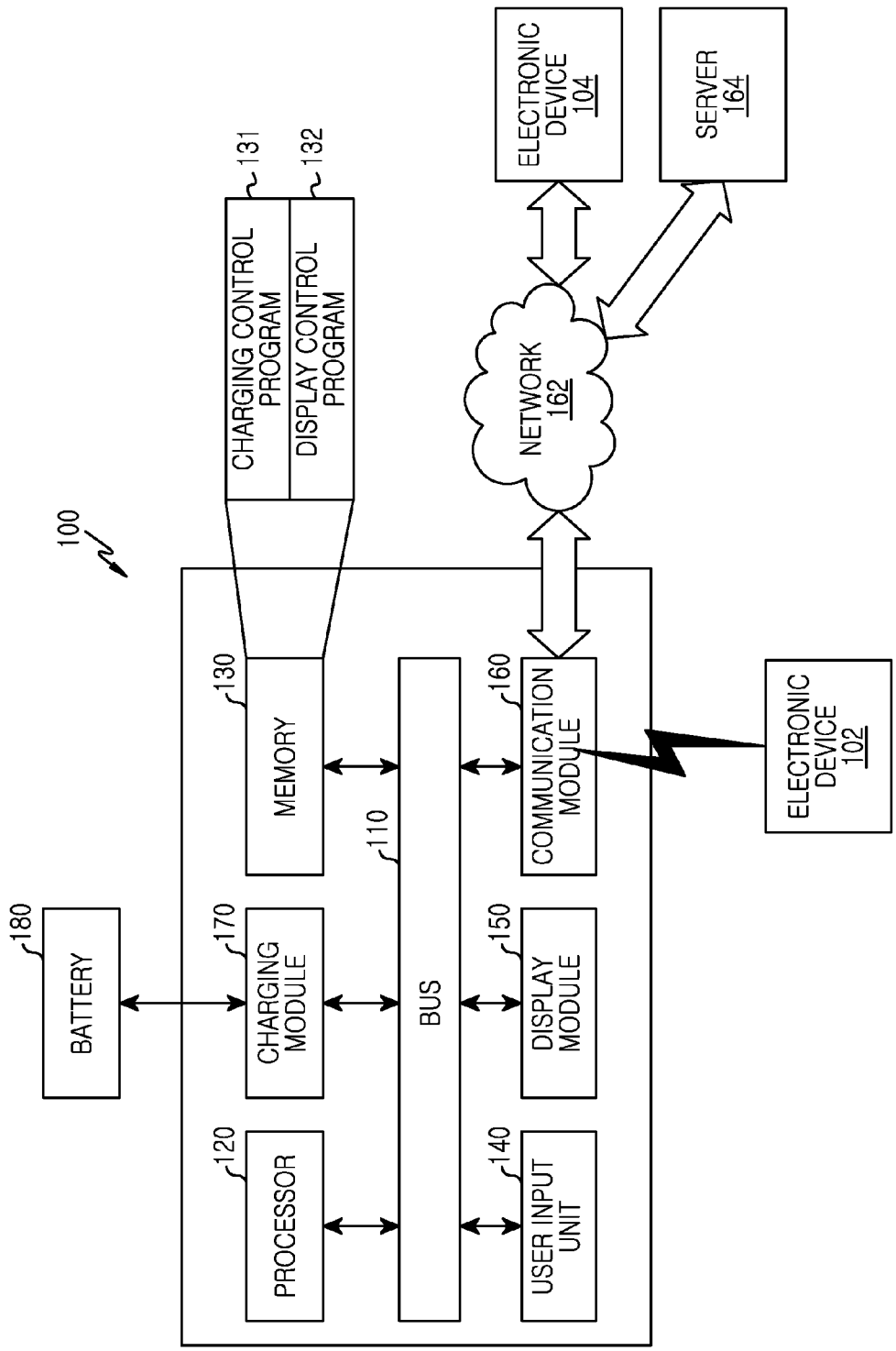
FIG. 1 is a block diagram illustrating a construction of an electronic device according to various embodiments.

Various embodiments are described below with reference to the accompanying drawings. The various embodiments are illustrated in the drawings and a related detailed description is stated, but various modifications may be made and several embodiments may be provided. Accordingly, it should be understood that the various embodiments do not intend to limit a specific embodiment form, and include all modifications or equivalents or substitutes included in the spirit and technological scope of the various embodiments. In relation to a description of the drawing, like reference symbols denote like constituent elements.

An electronic device according to various embodiments may be one or a combination of two or more of various devices including a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MPEG Audio Layer 3 (MP3) player, a mobile medical instrument, an electronic bracelet, an electronic necklace, an appcessory, a camera, a wearable device, an electronic clock, a wrist watch, a smart home appliance (e.g., a refrigerator, an air conditioner, a cleaner, an artificial intelligence robot, a TV, a Digital Video Disc (DVD) player, an audio system, an oven, a microwave, a washing machine, an air cleaner, and an electronic frame), various medical instruments (e.g., Magnetic Resonance Angiography (MRA), Magnetic Resonance Imaging (MRI), Computerized Tomography (CT), a moving-camera, and an ultrasound machine), a navigation device, a Global Positioning System (GPS) receiver, an Event Data Recorder (EDR), a Flight Data Recorder (FDR), a set-top box, a TV box (e.g., Samsung HomeSync™, AppleTV™, or Google TV™), an electronic dictionary, a car infotainment device, an electronic equipment for ship (e.g., a navigation device for ship and a gyrocompass), avionics, a security instrument, electronic clothes, an electronic locking system, a camcorder, a game console, a Head-Mounted Display (HMD), a flat panel display device, an electronic album, part of a furniture or building/structure including a telecommunication function, an electronic board, an electronic signature receiving device, or a projector. It is apparent to those skilled in the art that the electronic device according to the various embodiments is limited to the aforementioned instruments.

Figure 5:
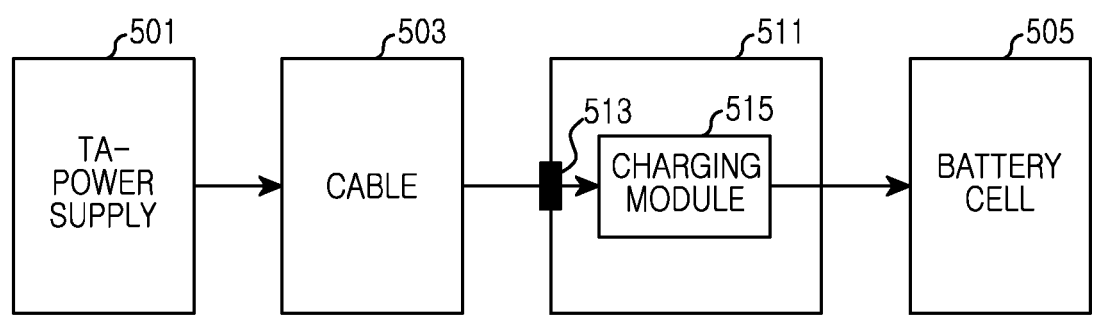
FIG. 5 illustrates a construction for charging a battery using one port included in a connector in an electronic device according to the conventional art.

First, in order to appreciate the understanding of the present disclosure, the conventional art for charging a battery cell 505 in an electronic device 511 will be described below with reference to FIG. 5.

Commonly, if a power source is applied from a power supply 501, the electronic device 511 may control a charging module 515 to charge the battery cell 505.

If the charging module 515 initiates the charging of the battery cell 505 in the electronic device 511, the charging module 515 constantly supplies a Constant Current (CC) to the battery cell 505 while charging the battery cell 505. After that, when a terminal voltage of the battery cell 505 reaches a reference voltage (e.g., 4.35 V), the charging module 515 is driven at a Constant Voltage (CV) to maintain the 4.35 V and may complete the charging of the battery cell 505 by decreasing a charging current. Here, a duration of until when the terminal voltage of the battery cell 505 reaches the reference voltage (e.g., 4.35 V) by the CC may be referred to as a 'CC duration', and a duration of until when the CV driving is conducted and the charging completion of the battery cell 505 may be referred to as a 'CV duration'.

Meanwhile, as one of several methods for shortening a charging time of the battery cell 505 or performing a quick charging of the battery cell 505, a method of increasing a charging current is used. However, because the charging current may increase not more than an allowable current of a connector 513, there is a limit in shortening the charging time or performing the quick charging by increasing the charging current.

Hereinafter, the teachings of the present disclosure will be described with reference to FIG. 1 through FIGS. 4 and 6.

FIG. 1 is a block diagram illustrating a construction of an electronic device according to various embodiments.

Referring to FIG. 1, the electronic device 100 may include a bus 110, a processor 120, a memory 130, a user input unit 140, a display module 150, a communication module 160, a charging module 170, and a battery 180. Here, the battery 180 may be a detachable battery or an embedded battery.

The other electronic devices 102 and 104, each are the same (e.g., same-type) device as the electronic device 100 or a different (e.g., different-type) device.

The bus 110 may be a circuit coupling the aforementioned constituent elements (e.g., the processor 120, the memory 130, the user input unit 140, the display module 150, the communication module 160, the charging module 170, or the battery 180) with one another and forwarding communication (e.g., a control message) between the aforementioned constituent elements.

Figure 2:
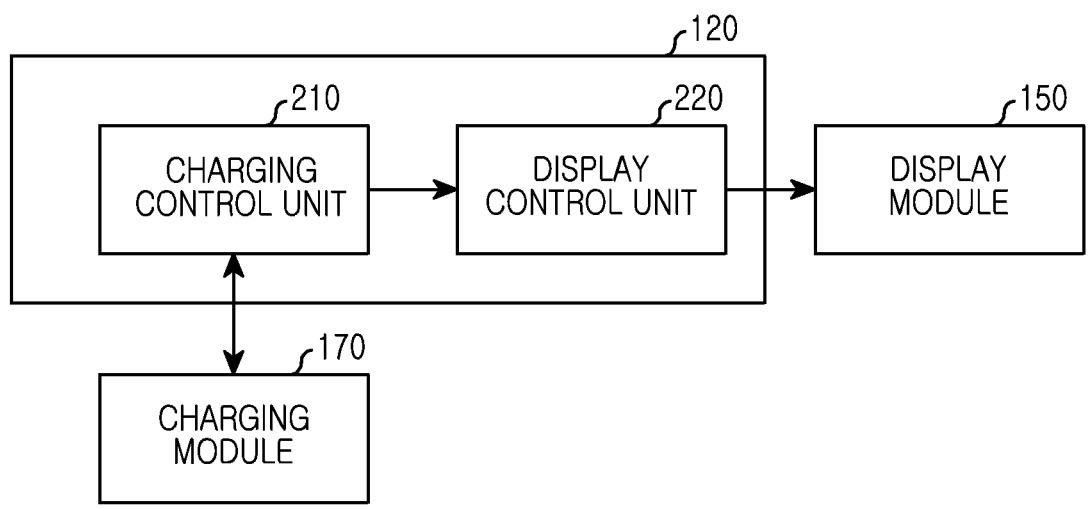
FIG. 2 is a detailed block diagram illustrating a construction of a processor according to various embodiments.

The processor 120 may receive instructions from the aforementioned other constituent elements through the bus 110, and decipher the received instructions, and execute operation or data processing according to the deciphered instructions. At this time, the processor 120 can execute at least one program stored in the memory 130 and control to provide a service in accordance to the corresponding program. For example, the processor 120 can be constructed as illustrated in FIG. 2 so as to execute a charging control program 131 and control an overall battery charging operation.

Also, the processor 120 may include one or more Application Processors (AP) or one or more Communication Processors (CP). Here, the AP and the CP may be included within the processor 120 or included within different Integrated Circuit (IC) packages, respectively. Also, the AP and the CP may be also included within one IC package. The AP may drive an operating system or an application program and control a plurality of hardware or software constituent elements coupled to the AP, and perform processing and operation of various data including multimedia data. Here, the AP may be implemented as a System On Chip (SoC). Also, the CP may perform at least a part of a multimedia control function. Also, the CP may perform terminal distinction and authorization within a communication network using a subscriber identification module (e.g., the SIM card). At this time, the CP may provide services including voice telephony, video telephony, text message, or packet data to a user. Also, the CP may control data transmission/reception of the communication module 160. The AP or the CP may load to a volatile memory an instruction or data received from a non-volatile memory coupled to each of the AP and the CP or at least one of other constituent elements, and process the loaded instruction or data. Also, the AP or the CP may store in the non-volatile memory data received from at least one of other constituent elements or generated by at least one of the other constituent elements. The CP may perform a function of managing a data link and converting a communication protocol, in communication between other electronic devices coupled with the electronic device including hardware through a network. Here, the CP may be implemented a SoC. Additionally, the processor 120 may further include a Graphic Processing Unit (GPU) (not shown).

The memory 130 may store an instruction or data received from the processor 120 or other constituent elements (e.g., the user input unit 140, the display module 150, the communication module 160, the charging module 170 or the battery 180) or generated by the processor 120 or the other constituent elements. At this time, the memory 130 may include an internal buffer and an external buffer.

Further, the memory 130 may include a charging control program 131 and a display control program 132. At this time, each of the programs may be comprised of a programming module, and each programming module may be comprised of software, firmware, hardware or a combination of at least two or more of them.

The charging control program 131 may include at least one software constituent element for controlling charging of a battery. For example, if a power source is applied, the charging control program 131 may control the charging module 170 and charge the battery by a $1^{st}$ charging current value through a $1^{st}$ Vbus port of a connector. At this time, the charging control program 131 may detect whether a voltage is sensed at a $2^{nd}$ Vbus port of the connector through a comparator. When the voltage is sensed at the $2^{nd}$ Vbus port through the comparator, the charging control program 131 may charge the battery using a $2^{nd}$ charging current that is greater than the $1^{st}$ charging current.

The display control program 132 may include at least one software constituent element for controlling at least one display data through the display module 150. For example, the display control program 132 may control to display a charging progress situation of a battery through the display module 150. At this time, the display control program 132 may also control the display module 150 to display an indication whether the charging process of the battery is an ordinary charging or a quick charging.

The memory 130 may include an internal memory or an external memory. The internal memory may include at least one of a volatile memory (e.g., a Dynamic Random Access Memory (DRAM), a Static RAM (SRAM), and a Synchronous Dynamic RAM (SDRAM)) or a non-volatile memory (e.g., a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, and a Not OR (NOR) flash memory). At this time, the internal memory may also take a form of a Solid State Drive (SSD). The external memory may include at least one of Compact Flash (CF), Secure Digital (SD), micro-SD, Mini-SD, extreme Digital (xD), or a memory stick.

Also, the memory 130 may include a kernel, a middleware, and an Application Programming Interface (API). The kernel may control or manage system resources (e.g., the bus 110, the processor 120 or the memory 130) used for executing an operation or function implemented in the remnant other programming modules (e.g., the middleware, the API or a program). Also, the kernel may provide an interface enabling the middleware, the API, or the program to connect and control or manage the individual constituent element of the electronic device 100. The middleware may perform a relay role of enabling the API or the program to communicate and exchange data with the kernel. Also, the middleware may perform load balancing for work requests received from at least one program using a method of allocating the work requests priority order capable of using the system resources (e.g., the bus 110, the processor 120, or the memory 130) of the electronic device 100. The API is an interface enabling the program to control a function provided by the kernel or the middleware. The API may include at least one interface or function for file control, window control, picture processing, or character control.

The user input unit 140 may receive an input of an instruction or data from a user and forward the instruction or data to the processor 120 or the memory 130 through the bus 110. For example, the user input unit 140 may include a touch panel, a pen sensor, a key, or an ultrasonic input device. The touch panel may recognize a touch input in at least one of a capacitive overlay method, a pressure sensitive method, an infrared beam method, or an acoustic wave method. Here, the touch panel may also further include a controller. In a case of the capacitive overlay method, physical contact or proximity recognition is possible. The touch panel may also further include a tactile layer. At this time, the touch panel may provide a tactile response to a user. For example, the pen sensor may be implemented in the same or similar method to receiving a user's touch input or using a separate sheet for recognition. For example, the key may include a keypad or a touch key. For example, the ultrasonic input device is a device capable of identifying data by sensing a sound wave by a microphone in the electronic device through a pen generating an ultrasonic signal, and enables wireless recognition.

The display module 150 may display a picture, an image or data to a user. The display module 150 may include a panel or a hologram. For example, the panel may be a Liquid Crystal Display (LCD) or an Active-Matrix Organic Light-Emitting Diode (AMOLED). Also, the panel may be implemented to be flexible, transparent, or wearable. Here, the panel may be also constructed as one module with the touch panel. For example, the hologram may show a three-dimensional image in the air using interference of light. Additionally, the display module 150 may further include a control circuit for controlling the panel or the hologram.

Also, the display module 150 may display data and/or other images in accordance to control of the display control program 132. For example, the display module 150 may display a charging progress situation of a battery. For another example, the display module 150 may also display if the charging progress situation of the battery is ordinary charging or quick charging.

The communication interface may establish communication between the electronic device 100 and other electronic devices 102 and 104. At this time, the communication module 160 support a short-range communication protocol (e.g., Wireless Fidelity (WiFi), Bluetooth (BT), or Near Field Communication (NFC)) or a network communication 162 (e.g., the Internet, a Local Area Network (LAN), a Wide Area Network (WAN), a telecommunication network, a cellular network, a satellite network, or a Plain Old Telephone System (POTS)).

Upon charging power source applying, the charging module 170 may measure a voltage of a battery cell, and charge the battery cell based on the measured voltage. For example, upon starting the charging operation, the charging module 170 constantly supplies a Constant Current (CC) to the battery cell for charging the battery cell. After that, when a terminal voltage of the battery cell reaches a reference voltage (e.g., 4.35 V) 311, the charging module 170 is driven at a Constant Voltage (CV) to maintain the 4.35 V and may complete the charging of the battery cell by decreasing a charging current.

Additionally, the electronic device 100 can further include a sensor module (not shown). The sensor module may include at least one of a gesture sensor, a gyro sensor, an air pressure sensor, a magnetic sensor, an acceleration sensor, a grip sensor, a proximity sensor, a Red, Green, Blue (RGB) sensor, a bio-physical sensor, a temperature/humidity sensor, an illumination sensor, or an Ultraviolet (UV) sensor. Also, the sensor module may meter a physical quantity or sense an activation state of the electronic device 100, and convert metered or sensed information into an electrical signal. For example, the sensor module may further include an E-nose sensor, an Electromyography (EMG) sensor, an Electroencephalogram (EEG) sensor, an Electrocardiogram (ECG) sensor, or a fingerprint sensor. Also, the sensor module may further include a control circuit for controlling at least one or more sensors belonging to therein.

The names of constituent elements of hardware according to various embodiments may be different in accordance with the type of the electronic device 100. The hardware according to various embodiments may include at least one of the constituent elements, omit some constituent elements or further include additional other constituent elements. Also, some of the constituent elements of the hardware according to various embodiments are combined and constructed as one entity, thereby being able to identically perform functions of the corresponding constituent elements before combination.

FIG. 2 is a detailed block diagram illustrating a construction of a processor according to various embodiments.

As illustrated in FIG. 2, the processor 120 may include a charging control unit 210 and a display control unit 220.

The charging control unit 210 may execute the charging control program 131 stored in the memory 130 and control charging of a battery. For example, if a power source is applied, the charging control unit 210 may control the charging module 170 and charge the battery by a $1^{st}$ charging current value through a $1^{st}$ Vbus port of a connector. At this time, the charging control unit 210 may detect whether a voltage is sensed at a $2^{nd}$ Vbus port of the connector through a comparator. When the voltage is sensed at the $2^{nd}$ Vbus port through the comparator, the charging control unit 210 may charge the battery using a $2^{nd}$ charging current that is greater than the $1^{st}$ charging current.

The display control unit 220 may execute the display control program 132 stored in the memory 130 and control to display data through the display module 150. For example, the display control unit 220 may control to display a charging progress situation of a battery. For another example, the display control unit 220 may control if the charging progress situation of the battery is ordinary charging or quick charging.

Figure 3:
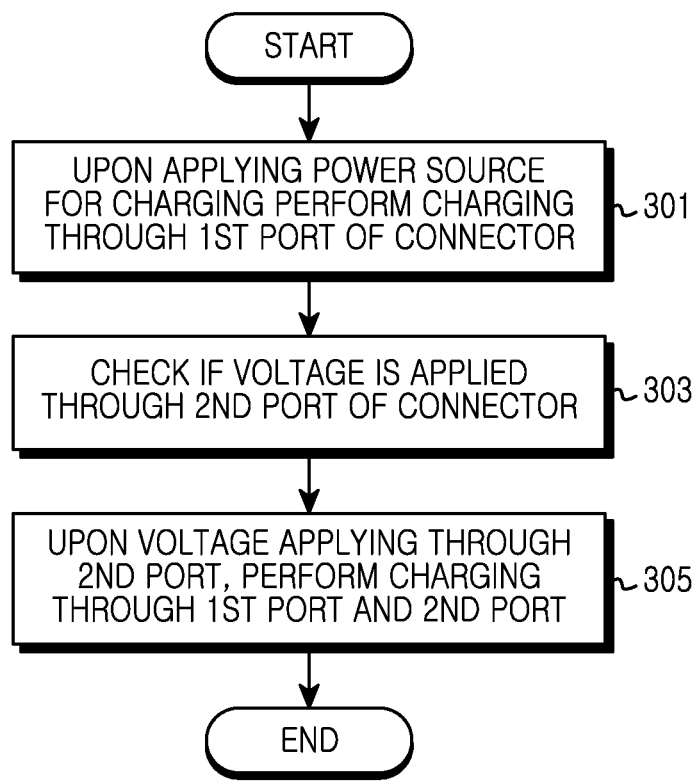
FIG. 3 and FIG. 4 illustrate procedures for charging a battery using a plurality of ports included in a connector in an electronic device according to various embodiments.
Figure 4:
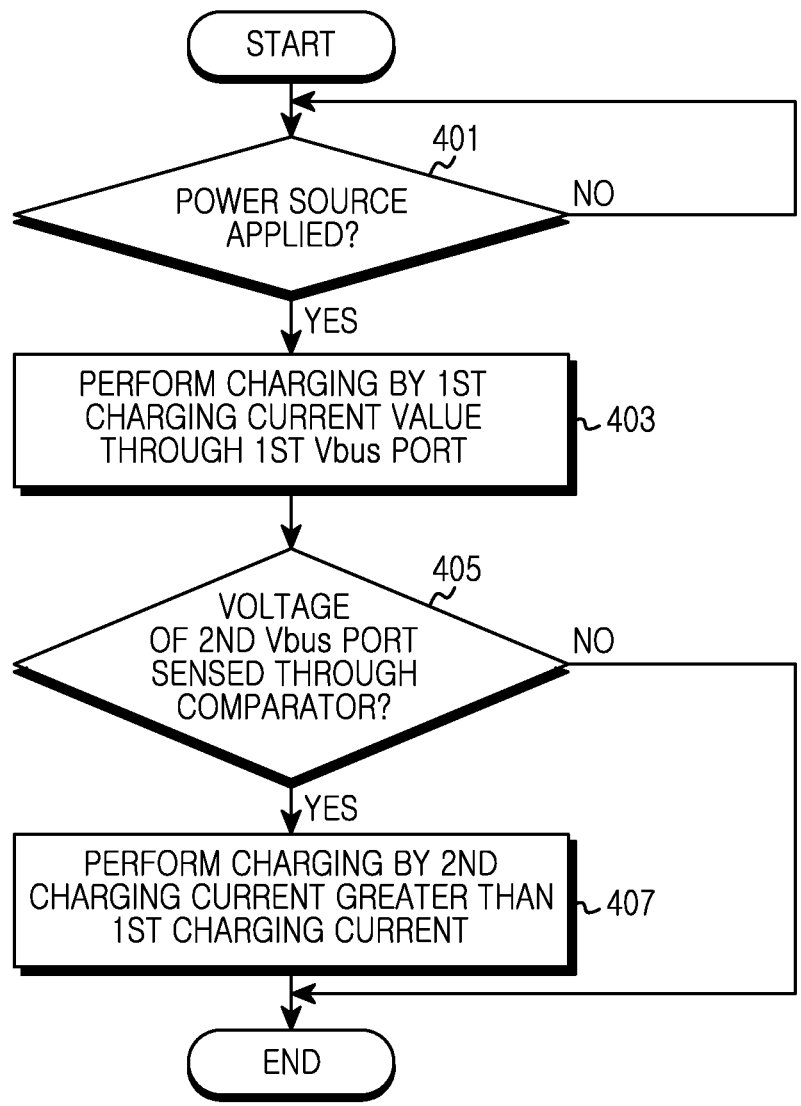

FIG. 3 and FIG. 4 illustrate procedures for charging a battery using a plurality of ports comprised in a connector in an electronic device according to various embodiments.

Figure 6A:
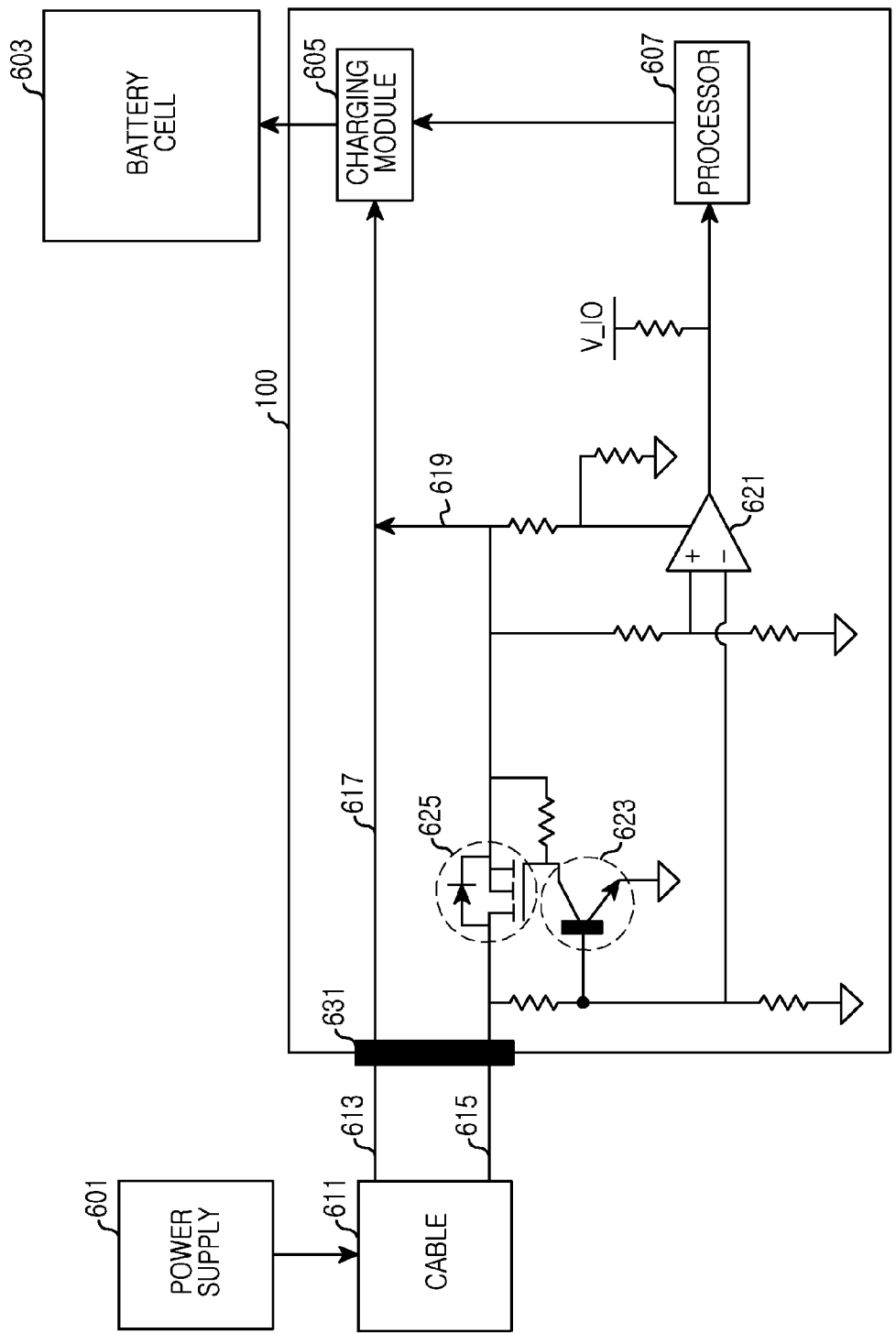
FIG. 6A and FIG. 6B illustrate constructions for charging a battery using a plurality of ports included in a connector in an electronic device according to various embodiments.

Referring to FIG. 3, in operation 301, upon applying power source for charging, the electronic device may perform charging operation through a $1^{st}$ port of a connector. For example, as illustrated in FIG. 6A, to decide whether to perform CC duration charging or perform CV duration charging when charging a battery cell 603 through a $1^{st}$ Vbus port 613 of a connector 631, a charging module 605 may detect whether voltages of both terminals of the battery cell 603 are reach a reference voltage (e.g., 4.35 V) which may be a full voltage of the battery cell. If it is checked that the voltages of the both terminals of the battery cell 603 are the reference voltage, the electronic device may perform the CV duration charging. Alternately, if it is checked that the voltages of the both terminals of the battery cell 603 are not the reference voltage, the electronic device may perform the CC for charging.

In operation 303, the electronic device may check voltage applying through a $2^{nd}$ port of the connector. For example, referring to FIG. 6A, a processor 607 may detect whether a voltage is applied to a $2^{nd}$ Vbus port 615 of the connector 631 through a comparator 621. In detail, the processor 607 may continuously send a check request to the comparator 621 to detect whether the voltage is applied through the $2^{nd}$ Vbus port 615 of the connector 631, and receive a response to the request. Also, if it is checked that the voltage is applied to the $2^{nd}$ Vbus port 615 of the connector 631, the comparator 621 may also notify the processor 607 that the voltage has been applied to the $2^{nd}$ Vbus port 615 of the connector 631.

In operation 305, upon detecting the voltage applied through the $2^{nd}$ port, the electronic device may perform the charging of the battery cell 603 through the $1^{st}$ port and the $2^{nd}$ port. The voltage to be supplied to the $2^{nd}$ port of the connector is from a second port of the power supplier. The voltage from a second port of the power supplier is supplied to the second port of the connector and the voltage from a first port of the power supplier is supplied to the first port of the connector.

For example, referring to FIG. 6A, if the voltage is applied through the $2^{nd}$ Vbus port 615 of the connector 631, a Bipolar Junction Transistor (BJT) 623 controls a Field Effect Transistor (FET) 625 and forms a $2^{nd}$ charging capacitance 619. Here, the FET 625 may perform a switching operation, and the BJT 623 may perform an operation of controlling a switch. Also, the reference numeral 623 may also denote a BJT or a FET. Concurrently with this, the comparator 621 may notify the processor 607 that the voltage application has been sensed through the $2^{nd}$ Vbus port 615, and the processor 607 may raise a $1^{st}$ charging current of the charging module 605 and perform the charging of the battery cell 603 by a $2^{nd}$ charging current (i.e., a charging current greater than the $1^{st}$ charging current) through the $1^{st}$ Vbus port 613 and the $2^{nd}$ Vbus port 615. For example, the $1^{st}$ charging current is 1.8 ampere and the $2^{nd}$ charging current 2.5 ampere. For the $2^{nd}$ charging current, the battery is charged by both the first and the second port. Block 301 and 303 are performed during the charging operation which is when the electronic is coupled to a power supplier (a charger).

Referring to FIG. 4, in operation 401, the electronic device may detect whether a power source is applied according to another embodiment. For example, as illustrated in FIG. 6A, the charging module 605 may detect whether the power source is applied from a power supply 601 through a $1^{st}$ charging path 617. Here, the power supply 601 may be a Travel Adapter (TA).

If the power source is applied, in operation 403, the electronic device may perform charging by a $1^{st}$ charging current (for example, 1.8 ampere) through the $1^{st}$ Vbus port. For example, as illustrated in FIG. 6A, to decide whether to perform CC duration charging or perform CV duration charging in charging the battery cell 603 through the $1^{st}$ Vbus port 613 of the connector 631, the charging module 605 may check if the voltages of the both terminals of the battery cell 603 are the reach a reference voltage (e.g., 4.35 V) If it is checked that the voltages of the both terminals of the battery cell 603 are the reference voltage, the electronic device may perform the CV duration charging. Alternately, if it is checked that the voltages of the both terminals of the battery cell 603 are not the reference voltage, the electronic device may also perform the CC duration charging.

At this time, in operation 405, the electronic device may check if a voltage of the $2^{nd}$ Vbus port is sensed through the comparator. For example, referring to FIG. 6A, the processor 607 may check if a voltage is applied to the $2^{nd}$ Vbus port 615 of the connector 631 through the comparator 621. In detail, the processor 607 may continuously send a check request to the comparator 621 to check if the voltage is applied through the $2^{nd}$ Vbus port 615 of the connector 631, and receive a response to the request. Also, if it is checked that the voltage is applied to the $2^{nd}$ Vbus port 615 of the connector 631, the comparator 621 may also notify the processor 607 that the voltage has been applied to the $2^{nd}$ Vbus port 615 of the connector 631.

If the voltage of the $2^{nd}$ Vbus port is sensed through the comparator, in operation 407, the electronic device may perform the charging by a $2^{nd}$ charging current 9 for example 2.5 ampere) greater than the $1^{st}$ charging current(for example, 1.8 ampere). For example, referring to FIG. 6A, if the voltage is applied through the $2^{nd}$ Vbus port 615 of the connector 631, the BJT 623 controls the FET 625 and forms the $2^{nd}$ charging capacitance 619. Here, the FET 625 may perform the switching operation, and the BJT 623 may perform the operation of controlling the switch. Also, the reference numeral 623 may also denote a BJT or a FET. Concurrently with this, the comparator 621 may notify the processor 607 that the voltage applying has been sensed through the $2^{nd}$ Vbus port 615, and the processor 607 may use a $2^{nd}$ charging current greater than the $1^{st}$ charging current of the charging module 605 and perform the charging of the battery cell 603 by the $2^{nd}$ charging current (i.e., the charging current value greater than the $1^{st}$ charging current) through the $1^{st}$ Vbus port 613 and the $2^{nd}$ Vbus port 615. In block 407 that both the first and second ports are operational to charge and here, the current is the second charging current which is, for example, a 2.5 ampere. Block 403 and Block 405 are performed when the electronic is coupled to a power supplier (a charger).

Figure 6B:
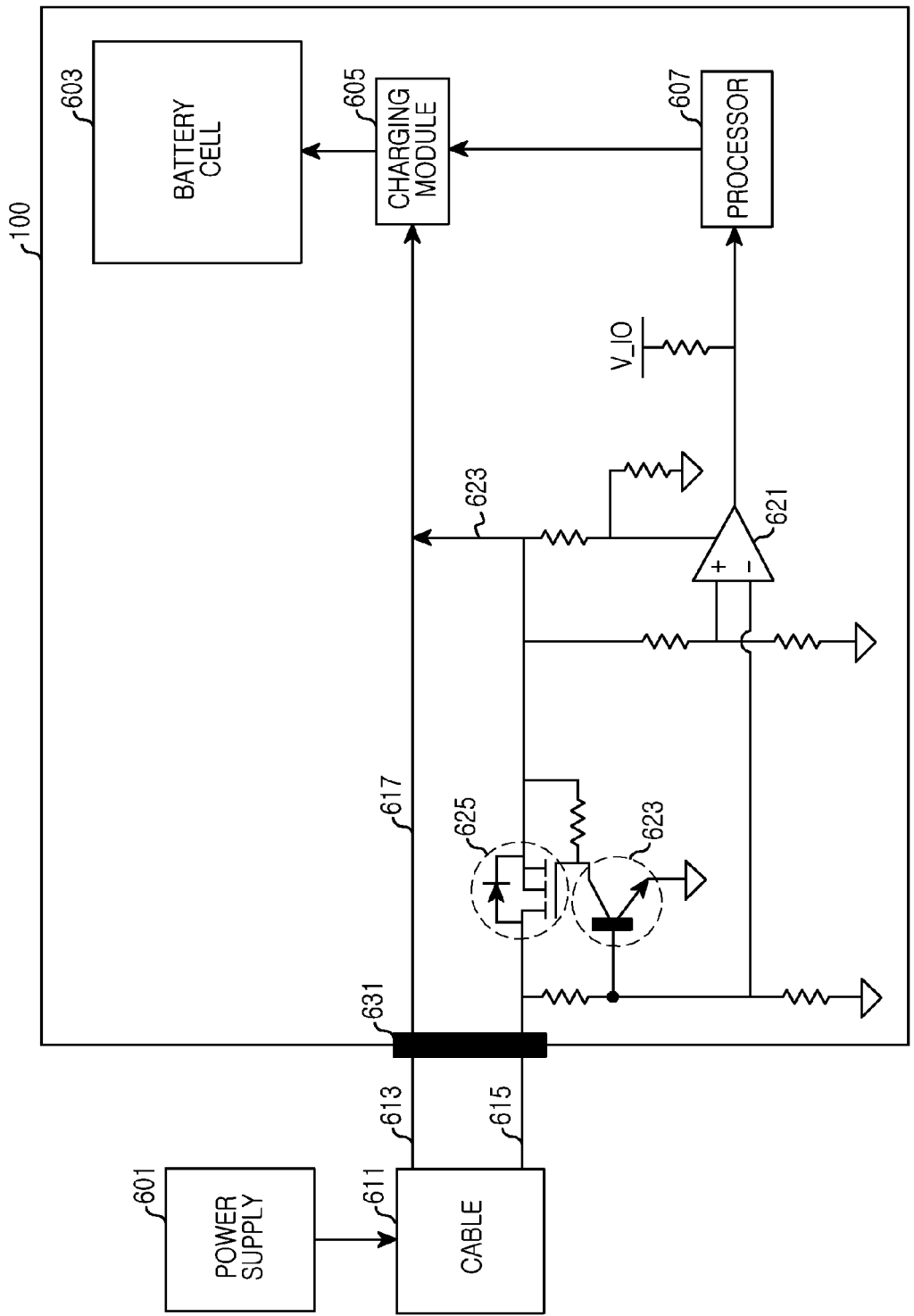

In the aforementioned embodiment, the detachable battery is described by way of example as illustrated in FIG. 6A. However, it should be noted that the teachings of the present disclosure can be applicable to an embedded battery as illustrated in FIG. 6B.

As described above, the electronic device may charge a battery through a plurality of ports included in a connector, thereby being able to reduce a charging time of the battery.

As these and other variations and combinations of the features discussed above can be utilized without departing from the disclosed subject matter as defined by the claims, the foregoing description of embodiments should be taken by way of illustration rather than by way of limitation of the disclosed subject matter as defined by the claims It will also be understood that the provision of examples of the disclosed subject matter (as well as clauses phrased as "such as," "e.g.", "including", "in some aspects, "in some implementations", and the like) should not be interpreted as limiting the disclosed subject matter to the specific examples; rather, the examples are intended to illustrate only some of many possible aspects The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "controller", "processor" or "microprocessor" constitute hardware in the claimed invention and include integrated circuitry. Under the broadest reasonable interpretation, the appended claims constitute statutory subject matter in compliance with 35 U.S.C. §101 and none of the elements constitute software per se. Nor is the invention a mere abstract idea.

The terms "unit" or "module" as may be used herein is to be understood as constituting or operating in conjunction with hardware such as a circuit, integrated circuit, processor or microprocessor configured for a certain desired functionality in accordance with statutory subject matter under 35 U.S.C. §101, and such terms do not constitute software per se.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

What is claimed is:

1. An electronic device for charging a battery cell, comprising:
    a charging module;
    a connector including a first port and a second port; and
    one or more processors configured to:
        upon detecting a charging power source, control the charging module to perform the charging of the battery cell by a first charging current through the first port of the connector,
        detect whether a voltage is applied through the second port of the connector, and
        when the voltage is applied through the second port of the connector, control the charging module to perform the charging of the battery cell through the first port and the second port of the connector using a second charging current.

2. The device of claim 1, wherein the voltage to be supplied to the second port of the connector is from a second port of an external power supplier and a voltage from a first port of the external power supplier is supplied to the first port of the connector, and
    wherein the external power supplier is connectable with the electronic device and is used for supplying the charging power source.

3. The device of claim 1, further comprising a comparator for detecting whether a voltage is applied through the second port of the connector.

4. The device of claim 1, wherein the second charging current is greater than the first charging current.

5. The device of claim 1, wherein the battery cell is detachable from the electronic device or disposed inside the electronic device.

6. The device of claim 1, further comprising a display device for displaying an indication of whether the charging is an ordinary charging type or a quick charging type.

7. A method in an electronic device, the method comprising:
upon detecting a power source, charging a battery cell by a first charging current through a first port of a connector,
detecting whether a voltage is applied through a second port of the connector, and
when the voltage is applied through the second port of the connector, charging the battery cell through the first port and the second port of the connector using a second charging current.

8. The method of claim 7, wherein the second charging current is greater than the first charging current.

9. The method of claim 7, wherein the battery cell is detachable from the electronic device or provided inside the electronic device.

10. The method of claim 7, further comprising displaying an indication of whether the charging is an ordinary charging type or a quick charging type.

11. An electronic device for charging a battery cell, comprising:
a charging module;
a connector including a first port and a second port; and
one or more processors configured to:
control the charging module to detect whether a first voltage is applied through the first port of the connector and a second voltage is applied through the second port of the connector, and
when the first voltage is applied through the first port of the connector and second voltage is applied through the second port of the connector, control the charging module to perform the charging of the battery cell through the first port and the second port of the connector using a second charging current which is greater than a first charging current used only when the first voltage is applied through the first port of the connector.

12. The device of claim 11, further comprising a comparator for detecting whether a voltage is applied through the second port of the connector.

13. The device of claim 11, wherein the second charging current is greater than the first charging current.

14. The device of claim 11, wherein the battery cell is detachable from the electronic device.

15. The device of claim 11, wherein the battery cell is disposed inside the electronic device.

16. The device of claim 11, further comprising a display device for displaying an indication of whether the charging is an ordinary charging type or a quick charging type.

17. The device of claim 11, wherein the voltage to be supplied to the second port of the connector is from a second port of an external power supplier and the voltage from a first port of the external power supplier is supplied to the first port of the connector, and
wherein the external power supplier is connectable with the electronic device and is used for supplying a charging power source.

* * * * *